United States Patent
Schmidt

(10) Patent No.: US 10,102,483 B2
(45) Date of Patent: *Oct. 16, 2018

(54) SYSTEM AND METHOD FOR AUTO-QUERY GENERATION

(71) Applicant: DataRobot, Inc., Boston, MA (US)

(72) Inventor: Michael Schmidt, Boston, MA (US)

(73) Assignee: DataRobot, Inc., Boston, MA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/351,002

(22) Filed: Nov. 14, 2016

(65) Prior Publication Data

US 2017/0193398 A1    Jul. 6, 2017

Related U.S. Application Data

(63) Continuation of application No. 14/202,780, filed on Mar. 10, 2014, now Pat. No. 9,524,473, which is a
(Continued)

(51) Int. Cl.
*G06F 17/30* (2006.01)
*G06N 99/00* (2010.01)
(Continued)

(52) U.S. Cl.
CPC ......... *G06N 99/005* (2013.01); *G06F 17/246* (2013.01); *G06F 17/30398* (2013.01); *G06N 7/005* (2013.01); *G06F 17/30442* (2013.01)

(58) Field of Classification Search
USPC ............... 707/609, 687, 705, 790, 813, 821
See application file for complete search history.

(56) References Cited

U.S. PATENT DOCUMENTS 7,117,185 B1    10/2006   Aliferis et al.
8,370,280 B1     2/2013   Lin et al.
(Continued)

FOREIGN PATENT DOCUMENTS

WO    WO-2010044683 A1    4/2010

OTHER PUBLICATIONS

Microsoft Excel 2013—Flash Fill Jul. 28, 2012.*
(Continued)

*Primary Examiner* — Sana A Al-Hashemi
(74) *Attorney, Agent, or Firm* — Goodwin Procter LLP

(57) ABSTRACT

Various systems and methods provide an intuitive user interface that enables automatic specification of queries and constraints for analysis by ML component. Various implementations provide methodologies for automatically formulating machine learning ("ML") and optimization queries. The automatic generation of ML and/or optimization queries can be configured to use examples to facilitate formulation of ML and optimization queries. One example method includes accepting input data specifying variables and data values associated with the variables. Within the input data any unspecified data records are identified, and a relationship between the variables specified in the input data and a variable associated with the at least one unspecified data record is automatically determined. The relationship can be automatically determined based on training data contained within the input data. Once a relationship is established a ML problem can be automatically generated.

20 Claims, 14 Drawing Sheets

Related U.S. Application Data continuation-in-part of application No. 14/016,287, filed on Sep. 3, 2013, now Pat. No. 9,495,641, and a continuation-in-part of application No. 14/016,300, filed on Sep. 3, 2013.

(60) Provisional application No. 61/695,637, filed on Aug. 31, 2012, provisional application No. 61/695,660, filed on Aug. 31, 2012, provisional application No. 61/779,451, filed on Mar. 13, 2013.

(51) Int. Cl.
  *G06N 7/00* (2006.01)
  *G06F 17/24* (2006.01)

(56) References Cited

U.S. PATENT DOCUMENTS

| | | | |
|---|---|---|---|
| 8,782,037 | B1 | 7/2014 | Barad et al. |
| 8,843,427 | B1 | 9/2014 | Lin et al. |
| 9,489,630 | B2 | 11/2016 | Achin et al. |
| 9,495,641 | B2 | 11/2016 | Schmidt |
| 9,524,473 | B2 | 12/2016 | Schmidt |
| 9,652,714 | B2 | 5/2017 | Achin et al. |
| 9,659,254 | B2 | 5/2017 | Achin et al. |
| 2002/0144178 | A1 | 10/2002 | Castelli et al. |
| 2004/0030777 | A1 | 2/2004 | Reedy et al. |
| 2004/0054997 | A1 | 3/2004 | Katragadda et al. |
| 2005/0183073 | A1 | 7/2005 | Reynolds |
| 2006/0101014 | A1 | 5/2006 | Forman et al. |
| 2006/0190285 | A1 | 8/2006 | Harris et al. |
| 2007/0133848 | A1 | 6/2007 | McNutt et al. |
| 2008/0307399 | A1* | 12/2008 | Zhou .................. G06N 3/126 717/141 |
| 2010/0131314 | A1 | 5/2010 | Lo Yuk Ting et al. |
| 2010/0312718 | A1* | 12/2010 | Rosenthal .......... G06Q 40/04 705/36 R |
| 2012/0144325 | A1 | 6/2012 | Mital et al. |
| 2012/0192051 | A1 | 7/2012 | Rothschiller et al. |
| 2012/0202240 | A1 | 8/2012 | Deigner et al. |
| 2013/0073061 | A1 | 3/2013 | Mu et al. |
| 2013/0096892 | A1 | 4/2013 | Essa et al. |
| 2013/0290226 | A1 | 10/2013 | Dokken |
| 2014/0074829 | A1 | 3/2014 | Schmidt |
| 2014/0136452 | A1 | 5/2014 | Wellman et al. |
| 2014/0172773 | A1 | 6/2014 | Schmidt |
| 2014/0258189 | A1 | 9/2014 | Schmidt |
| 2015/0339572 | A1 | 11/2015 | Achin et al. |
| 2016/0048766 | A1 | 2/2016 | McMahon et al. |
| 2016/0335550 | A1 | 11/2016 | Achin et al. |
| 2016/0364647 | A1 | 12/2016 | Achin et al. |
| 2017/0243140 | A1 | 8/2017 | Achin et al. |
| 2018/0046926 | A1 | 2/2018 | Achin et al. |
| 2018/0060738 | A1 | 3/2018 | Achin et al. |
| 2018/0060744 | A1 | 3/2018 | Achin et al. |

OTHER PUBLICATIONS

U.S. Appl. No. 14/016,300, filed Sep. 3, 2013, Schmidt.
U.S. Appl. No. 15/295,579, filed Oct. 17, 2016, Schmidt.
Barresse, Microsoft Excel 2013—Flash Fill. Microsoft Excel and Access Experts Blog. Jul. 28, 2012. retrieved from https://excelandaccess.wordpress.com/2012/07/28/excel-2013-flash-fill/ [Mar. 3, 2016 1:45:25 PM].
Ekart et al., A Metric for Genetic Programs and Fitness Sharing. Genetic Programming. Springer Berlin Heidelberg. EuroGP 2000, LNCS 1802. 2000. 259-70.
Mitra et al., Multi-objective evolutionary biclustering of gene expression data. Pattern Recognition. 2006;39(12):2464-77.
Schmidt et al., Automated refinement and inference of analytical models for metabolic networks. Phys Biol. Oct. 2011;8(5):055011. doi: 10.1088/1478-3975/8/5/055011. Epub Aug. 10, 2011.
Schmidt et al., Distilling free-form natural laws from experimental data. Science. Apr. 3, 2009;324(5923):81-5. doi: 10.1126/science.1165893.
Vladislavleva et al., Order of Nonlinearity as a Complexity Measure for Models Generated by Symbolic Regression via Pareto Genetic Programming. IEEE Transactions on Evolutionary Computation. 2008;13(2):333-49.
A. Lorbert et al., Descent Methods for Tuning Parameter Refinement, Proceedings of the 13th International Conference on Artificial Intelligence and Statistics (AISTATS), 2010, pp. 469-476.
A. Rudi et al., Adaptive Optimization for Cross Validation, Proceedings of the European Symposium on Artificial Neural Networks, Computational Intelligence, and Machine Learning, 2012, pp. 435-440.
B. Boukhatem et al., Predicting concrete properties using neural networks (NN) with principal component analysis (PCA) technique, Computers and Concrete, vol. 10, No. 6, 2012, pp. 1-17.
B. Flyvbjerg et al., What Causes Cost Overruns in Transport Infrastructure Projects?, Transport Reviews, vol. 24, 2004, pp. 1-40.
B.K. Behera et al., Aabric Quality Evaluation by Objective Measurement, Indian Journal of Fibre and Textile Research, vol. 19, 1994, pp. 168-171.
C. Bordat et al., An Analysis of Cost Overruns and Time Delays of INDOT Projects, Final Report, FHWA/IN/JTRP-2004/7, Joint Transportation Research Program, Purdue University, 2004, 191 pages.
F. Xiao et al., Prediction of Fatigue Life of Rubberized Asphalt Concrete Mixtures Containing Reclaimed Asphalt Pavement Using Artificial Neural Networks, Journal of Materials in Civil Engineering, 2007, 41 pages.
G. Biau et al., COBRA: A Nonlinear Aggregation Strategy, Cornell University Library, Nov. 2013, 40 pages.
G. Bortolin et al., on modeling of curl in multi-ply paperboard, Journal of Process Control, vol. 16, 2006, pp. 419-429.
G. Bortolin, On Modeling and Estimation of Curl and Twist in Multi-ply Paperboard, Licentiate Thesis, Optimization and Systems Theory, Department of Mathematics, Royal Institute of Technology, Stockholm, Sweden, 2002, 97 pages.
Google Cloud Platform—Smart Autofill Spreadsheets Add On—Predication API. Apr. 23, 2015. retrieved from https://cloud.google.com/prediction/docs/smart_autofill_add_on. [Aug. 23, 2015], 9 pages.
I.M. Alsmadi et al., Evaluation of Cost Estimation Metrics: Towards a Unified Terminology, Journal of Computing and Information Technology, vol. 21, Mar. 2013, pp. 23-34.
International Preliminary Report on Patentability for International Application No. PCT/US2015/032203 dated Nov. 29, 2016. (9 pages).
International Search Report and Written Opinion in PCT/US2015/032203 dated Jul. 22, 2015, 10 pages.
International Search Report and Written Opinion in PCT/US2017/057753 dated Feb. 12, 2018, 14 pages.
K. Valkili et al., Finding Regression Outliers with FastRCS, Cornell University Library, Feb. 2014, 23 pages.
M. Claesen et al., Hyperparameter tuning in Python using Optunity, International Workshop on Technical Computing for Machine Learning and Mathematical Engineering (TCMM), Sep. 2014, 2 pages.
N. Deshpande et al., Modelling Compressive Strength of Recycled Aggregate Concrete by Artificial Neural Network, Model Tree and Non-linear Regression, International Journal of Sustainable Built Environment, Dec. 2014, pp. 187-198.
N. Deshpande et al., Modelling Compressive Strength of Recycled Aggregate Concrete Using Neural Networks and Regression, Concrete Research Letters, vol. 4(2), Jun. 2013, pp. 580-590.
N. Sharma et al., Incorporating Data Mining Techniques on Software Cost Estimation: Validation and Improvement, International Journal of Emerging Technology and Advanced Engineering, vol. 2, Mar. 2012, pp. 301-309.
P. Ramesh, Prediction of Cost Overruns Using Ensemble Methods in Data Mining and Text Mining Algorithms, Master's Thesis, Graduate Program in Civil and Environmental Engineering, Rutgers University, Jan. 2014, 50 pages.
P.J. Edwards et al., The application of neural networks to the paper-making industry, Proceedings of the European Symposium on Artificial Neural Networks, Apr. 1999, 6 pages.

(56) References Cited

OTHER PUBLICATIONS

R. Strapasson et al., Tensile and impact behavior of polypropylene/low density polyethylene blends, Polymer Testing 24, 2005, pp. 468-473.

S. Zheng, Boosting Based Conditional Quantile Estimation for Regression and Binary Classification, Proceedings of the 9th Mexican international conference on Artificial intelligence, 2010, pp. 67-79.

S.C. Lhee et al., Development of a two-step neural network-based model to predict construction cost contingency, Journal of Information Technology in Construction, vol. 19, Sep. 2014, pp. 399-411.

S.T. Yousif et al., Artificial Neural Network Model for Predicting Compressive Strength of Concrete, Tikrit Journal of Engineering Sciences, vol. 16, 2009, pp. 55-63.

V. Chandwani et al., Applications of Soft Computing in Civil Engineering: A Review, International Journal of Computer Applications, vol. 81, Nov. 2013, pp. 13-20.

V. Chandwani et al., Modeling Slump of Ready Mix Concrete Using Genetically Evolved Artificial Neural Networks, Advances in Artificial Neural Systems, Nov. 2014, 9 pages.

X. He et al., Practical Lessons from Predicting Clicks on Ads at Facebook, Proceedings of ADKDD'14, Aug. 2014, 9 pages.

Y. Shan et al., Machine Learning of Poorly Predictable Ecological Data, Ecological Modeling, vol. 195, 2006, pp. 129-138.

Y.X. Zhao et al., Concrete cracking process induced by steel corrosion—A review, Proceedings of the Thirteenth East Asia-Pacific Conference on Structural Engineering and Construction, Sep. 2013, pp. 1-10.

Z.A. Khalifelu et al., Comparison and evaluation of data mining techniques with algorithmic models in software cost estimation, Procedia Technology, vol. 1, 2012, pp. 65-71.

T. Kraska et al. MLbase: A distributed machine-learning system. In Proceedings of 6th Biennial Conference on Innovative Data Systems Research (CIDR'13), Jan. 6, 2013 (7 pages). Available at <http://cidrdb.org/cidr2013/Papers/CIDR13_Paper118.pdf>.

* cited by examiner

| | A 210 | B 212 | C 214 | D 216 | E | F | G |
|---|---|---|---|---|---|---|---|
| 1 | Pressure [Atm] | Temp [C] | Flow [GPM] | Strength [MPa] | | | |
| 2 | 1.2 | 35 | 8.5 | 0.91 | | | |
| 3 | 1.9 | 49 | 1.7 | 0.40 | | | |
| 4 | 1.5 | 11 | 8.8 | 0.04 | | | |
| 5 | 1 | 40 | 8.5 | 0.77 | | | |
| 6 | 1.4 | 20 | 5.9 | 0.52 | | | |
| 7 | 1.1 | 25 | 6.7 | 0.48 | | | |
| 8 | 1.2 | 28 | 6.9 | 0.13 | | | |
| 9 | 1.2 | 47 | 9.4 | 0.43 | | | |
| 10 | 2 | 38 | 7.5 | | | | |
| 11 | 1.7 | 46 | 4.6 | | | | |
| 12 | 1.1 | 43 | 7.6 | | | | |
| 13 | 1.1 | 31 | 3 | | | | |
| 14 | 2 | 11 | 6.4 | | | | |
| 15 | 1.1 | 17 | 9.3 | | | | |

| | A | B | C | D | E | F | G |
|---|---|---|---|---|---|---|---|
| 1 | Pressure [Atm] | Temp [C] | Flow [GPM] | Strength [MPa] | | | |
| 2 | 1.2 | 35 | 8.5 | 0.91 | | | |
| 3 | 1.9 | 49 | 1.7 | 0.40 | | | |
| 4 | 1.5 | 11 | 8.8 | 0.04 | | | |
| 5 | 1 | 40 | 8.5 | 0.77 | | | |
| 6 | 1.4 | 20 | 5.9 | 0.52 | | | |
| 7 | 1.1 | 25 | 6.7 | 0.48 | | | |
| 8 | 1.2 | 28 | 6.9 | 0.13 | | | |
| 9 | 1.2 | 47 | 9.4 | 0.43 | | | |
| 10 | 2 | 38 | 7.5 | | | | |
| 11 | 1.7 | 46 | 4.6 | | | | |
| 12 | 1.1 | 43 | 7.6 | | | | |
| 13 | 1.1 | 31 | 3 | | | | |
| 14 | 2 | 11 | 6.4 | | | | |
| 15 | 1.1 | 17 | 9.3 | | | | |

Strenght = f (Pressure, Temp, Flow)

| Pressure | Temp | Flow | Strength |
|---|---|---|---|
| 1.1 | 12 | 8.5 | 0.27 |
| 1.6 | 25 | 2.4 | 0.42 |
| 1.9 | 29 | 9.7 | 0.80 |
| 1.6 | 57 | 2.8 | 0.94 |
| 1 | 47 | 6.1 | 0.71 |
| 1.3 | 24 | 8.5 | 0.18 |
| 1.7 | 32 | 2 | 0.01 |
| 1.8 | 14 | 7.5 | 0.16 |

| | A | B | C | D | E | F | G |
|---|---|---|---|---|---|---|---|
| 1 | Pressure [Atm] | Temp [C] | Flow [GPM] | Strength [MPa] | | | |
| 2 | 1.1 | 12 | 8.5 | 0.27 | | | |
| 3 | 1.6 | 25 | 2.4 | 0.42 | | | |
| 4 | 1.9 | 29 | 9.7 | 0.80 | | | |
| 5 | 1.6 | 57 | 2.8 | 0.94 | | | |
| 6 | 1 | 47 | 6.1 | 0.71 | | | |
| 7 | 1.3 | 24 | 8.5 | 0.18 | | | |
| 8 | 1.7 | 32 | 2 | 0.01 | | | |
| 9 | 1.8 | 14 | 7.5 | 0.16 | | | |
| 10 | 1 | 55 | 8 | 0.75 | | | |
| 11 | 1.4 | 10 | 7.5 | 0.90 | | | |
| 12 | 1.4 | 15 | 1.7 | 0.63 | | | |
| 13 | 1.8 | 59 | 8.9 | 0.92 | | | |
| 14 | 1.7 | 57 | 7.4 | 0.43 | | | |
| 15 | 1.1 | 13 | 4.6 | 0.11 | | | |

FIG. 2C

| | A | B | C | D | E | F | G |
|---|---|---|---|---|---|---|---|
| 1 | Pressure [Atm] | Temp [C] | Flow [GPM] | Strength [MPa] | | | |
| 2 | 1.5 | 53 | 10 | 0.89 | | | |
| 3 | 1.1 | 49 | 4.9 | 0.18 | | | |
| 4 | 1.4 | 51 | 7.8 | 0.99 | | | |
| 5 | 1.3 | 20 | 1.1 | 0.51 | | | |
| 6 | 1.5 | 13 | 3 | 0.48 | | | |
| 7 | 1.4 | 16 | 7.9 | 0.77 | | | |
| 8 | 1.9 | 48 | 9.9 | 0.64 | | | |
| 9 | 1 | 38 | 5.2 | 0.99 | | | |
| 10 | 1.7 | 42 | 1.4 | 0.27 | | | |
| 11 | 1.8 | 20 | 1.2 | 0.48 | | | |
| 12 | 1.6 | 20 | 5.3 | 0.88 | | | |
| 13 | 1.9 | 49 | 3.7 | 0.57 | | | |
| 14 | 1.2 | 16 | 6.3 | 1.00 | | | |
| 15 | 1.5 | 26 | 6 | 0.62 | | | |

Why?

Strength=temp·pressure/flow$^2$

| | A | B | C | D | E |
|---|---|---|---|---|---|
| 1 | Pressure [Atm] | Temp [C] | Flow [GPM] | Strength [MPa] | |
| 2 | 1.4 | 57 | 1.2 | 0.68 | |
| 3 | 1.1 | 29 | 8.2 | 0.12 | |
| 4 | 1 | 12 | 2.9 | 0.31 | |
| 5 | 1.2 | 11 | 2.7 | 0.55 | |
| 6 | 1.2 | 18 | 7.8 | 0.64 | |
| 7 | 1.8 | 60 | 7 | 0.83 | |
| 8 | 1.9 | 29 | 8.3 | 1.00 | |
| 9 | 1.1 | 54 | 4.1 | 0.29 | |
| 10 | 1.4 | 54 | 9.3 | 0.06 | |
| 11 | 1.7 | 60 | 8.3 | 0.81 | |
| 12 | 2 | 10 | 2.8 | 0.82 | |
| 13 | 1.3 | 29 | 1.8 | 0.08 | |
| 14 | 1.7 | 15 | 8.5 | 0.40 | |
| 15 | 1.7 | 35 | 2.9 | 0.49 | |
| 16 | | | | 10 | |

Average: 10.28735631  Count: 61  Sum 586.3793097

| | A | B | C | D | E | F | G |
|---|---|---|---|---|---|---|---|
| 1 | Pressure [Atm] | Temp [C] | Flow [GPM] | Strength [MPa] | | | |
| 2 | 1 | 60 | 2.7 | 0.93 | | | |
| 3 | 1.4 | 50 | 5.9 | 0.35 | | | |
| 4 | 2 | 34 | 9.1 | 0.23 | | | |
| 5 | 1.5 | 17 | 4.5 | 0.99 | | | |
| 6 | 1.2 | 47 | 7.5 | 0.51 | | | |
| 7 | 1.4 | 59 | 4.7 | 0.56 | | | |
| 8 | 1.1 | 31 | 4.1 | 0.96 | | | |
| 9 | 1.4 | 57 | 5.2 | 0.37 | | | |
| 10 | 1.7 | 12 | 4.1 | 0.03 | | | |
| 11 | 1.3 | 22 | 6 | 0.57 | | | |
| 12 | 1.7 | 46 | 2.5 | | | | |
| 13 | 2 | 55 | 5.2 | | | | |
| 14 | 1 | 58 | 7.5 | | | | |
| 15 | 1.8 | 38 | 9.1 | | | | |
| 16 | | 56 | | 0 | | | |
| 17 | | | | | | | |
| 18 | | | | | | | |
| 19 | | | | | | | |

Data Collection and Query Patterns

SYSTEM AND METHOD FOR AUTO-QUERY GENERATION

RELATED APPLICATIONS

This application is a continuation of and claims priority under 35 U.S.C. § 120 to U.S. patent application Ser. No. 14/202,780, entitled "SYSTEM AND METHOD FOR AUTO-QUERY GENERATION," filed on Mar. 10, 2014 which is a continuation-in-part and claims priority under 35 U.S.C. § 120 to U.S. patent application Ser. No. 14/016,287, entitled "SYSTEMS AND METHODS FOR DATA SET SUBMISSION, SEARCHING AND RETRIEVAL," filed on Sep. 3, 2013, which claims priority to U.S. Provisional Patent Application 61/695,660, entitled "SYSTEMS AND METHODS FOR SYMBOLIC ANALYSIS BETWEEN DATA SETS," filed Aug. 31, 2012 and U.S. Provisional Patent Application 61/695,637, entitled "SYSTEMS AND METHODS FOR DATA SET SUBMISSION, SEARCHING AND RETRIEVAL," filed Aug. 31, 2012. U.S. patent application Ser. No. 14/202,780 also is a continuation-in-part and claims priority under 35 U.S.C. § 120 to U.S. patent application Ser. No. 14/016,300 entitled "SYSTEMS AND METHODS FOR SYMBOLIC ANALYSIS," filed Sep. 3, 2013 which claims priority to U.S. Provisional Patent Application 61/695,660, "SYSTEMS AND METHODS FOR SYMBOLIC ANALYSIS BETWEEN DATA SETS," filed on Aug. 31, 2012, and U.S. Provisional Application Ser. No. 61/695,637 entitled "SYSTEMS AND METHODS FOR DATA SET SUBMISSION, SEARCHING AND RETRIEVAL," filed on Aug. 31, 2012. U.S. patent application Ser. No. 14/202,780 also claims priority under 35 U.S.C. § 119 to U.S. Provisional Patent Application 61/779,451, entitled "SYSTEM AND METHOD FOR AUTO-QUERY GENERATION," filed on Mar. 13, 2013. Each of the above-identified applications is incorporated herein by reference in its entirety.

BACKGROUND

A major bottleneck in the use of advanced machine-learning ("ML") techniques and tools today is that they require a substantial technical skill level to operate. While data is becoming increasingly easy to collect, store and manipulate for lay persons, analysis tools are not keeping pace.

Many machine-learning (ML) algorithms exist today that can allow their users to automatically generate computational models for prediction and optimization. For example, Neural networks, Support vector machines, decision trees, symbolic regression, and other techniques create a mathematical model that can be applied to predict dependent values from new independent variables, based on examples (training data). These models can be used to predict values in static tables as well as in dynamic time series. Vector equations that predict multiple values simultaneously (e.g., x, y coordinates) are also available. Conventionally, users specify a query that the ML system solves, delivering a model that can be used for the predictions, regression, or classification of values.

In addition to predicting unknown dependent values, ML models can also be used for optimization. Search algorithms such as gradient ascent or global search algorithms such as Genetic Algorithms can be used to search for an optimal set of independent variables such that the dependent variable is maximized or minimized, or becomes as close as possible to a desired value. Again, in order to interact with the system, the user specifies the boundaries of the optimization problem and any constraints that apply.

SUMMARY

According to one aspect, it is realized that ML techniques and approaches are not meeting their potential. In particular, common users find the generation and development of a query for an ML system too challenging. Lay persons and more novice users find the task of query definition overwhelming. Frustration can results from imprecise query generation, where "bad" answers are delivered in response to improperly formatted queries, or models are generated that are incapable of being used.

Accordingly, various aspects provide systems and methods to alleviate the difficulty of query generation. According to one embodiment, the systems and methods provide an intuitive user interface that enables automatic specification of queries and constraints. Various implementations provide novel methodologies for automatically formulating machine learning and optimization queries. The automatic generation of ML and/or optimization queries can be configured to use examples to facilitate formulation of ML and optimization queries.

According to one aspect, a computer implemented method for automatically generating machine learning problems is provided. The method comprises accepting, by a computer system, input data specifying variables and data values associated with the variables, identifying, by the computer system, at least one unspecified data record within the input data, determining, automatically, by the computer system, a relationship between the variables specified in the input data and a variable associated with the at least one unspecified data record, based on training data contained within the input data, and generating, automatically, by the computer system a machine learning problem including the relationship between the variables and the training data.

According to one embodiment, the method further comprises solving, automatically by the computer system, the machine learning problem to provide a result value for the at least one unspecified data record within the input data. According to one embodiment, the method further comprises assigning a function for calculating the result value to the at least one unspecified data record. According to one embodiment, the method further comprises displaying, by the computer system the machine learning problem. According to one embodiment, accepting the input data includes accepting within a spreadsheet display of variables and data values selection of a group of the variables, the data values, and the at least one unspecified data record.

According to one embodiment, identifying, determining, and generating occur in response to selection of the group. According to one embodiment, the method further comprises determining a confidence value associated with the result value. According to one embodiment, the method further comprises encoding, visually, the confidence level associated with the result value. According to one embodiment, encoding visually the confidence level associated with the result value includes displaying a value having a high relative confidence value bolder than a value having a lower relative confidence value. According to one embodiment, the method further comprises converting categorical values from the input data into set membership binary values.

According to one embodiment, generating, automatically, by the computer system the machine learning problem including the relationship between the variables and the training data, includes generating the machine learning problem based on symbolic regression. According to one embodiment, generating, automatically, by the computer system, the machine learning problem includes: generating one or more possible query patterns that relate a blank or otherwise identified cell in a spreadsheet to its surrounding non-blank cells, collecting data from the spreadsheet that matches that pattern, running a ML algorithm to find a model and determine its confidence level, and selecting the model having the highest confidence level.

According to one embodiment, the method further comprises filling in values in all blank cells that fit the query pattern using the selected model with the highest confidence level. According to one embodiment, generating one or more possible query patterns includes generating possible patterns including both absolute cell positions and cell positions that are relative to the at least one unspecified data record in a spreadsheet. According to one embodiment, the method further comprises accepting at least one new unspecified data record, and calculating a result value for the at least one new unspecified data record according to the input data and the result value for the at least one unspecified data record.

According to one embodiment, generating, automatically, by the computer system the machine learning problem including the relationship between the variables and the training data includes automatically formulating prediction queries to fill in the at least one unspecified data record. According to one embodiment, the at least one unspecified data record is at least one blank cell in a spreadsheet, and wherein the prediction query is generated based on the relationship between the at least one blank cell and cells having data values. According to one embodiment, generating, automatically, by the computer system the machine learning problem including the relationship between the variables and the training data includes automatically formulating at least one optimization query to fill in the at least one unspecified data record. According to one embodiment, the at least one unspecified data record is at least one blank cell in a spreadsheet, and wherein the optimization query is generated based on the relationship between the at least one blank cell and cells having data values.

According to one embodiment, generating, automatically, by the computer system a machine learning problem including the relationship between the variables and the training data includes: generating a model that relates a target value to the blank value; and performing a search to identify the optimal value of the blank cells that minimize the difference between the target value and the value predicted by the model. According to one embodiment, the method further comprises holding constant at least some of the non-blank cells corresponding to independent variables as search constraints. According to one embodiment, multiple target values are optimized simultaneously using a multi-objective optimization technique. According to one embodiment, the method further comprises accepting constraints defined against the at least one unspecified data record.

According to one aspect, a system for automatically generating machine learning problems is provided. The system comprises at least one processor operatively connect to a memory, the at least one processor when executing is configured to: accept input data specifying variables and data values associated with the variables, identify at least one unspecified data record within the input data, determine, automatically, a relationship between the variables specified in the input data and a variable associated with the at least one unspecified data record, based on training data contained within the input data, and generate, automatically, a machine learning problem including the relationship between the variables and the training data.

According to one embodiment, the at least one processor is configured to solve, automatically, the machine learning problem to provide a result value for the at least one unspecified data record within the input data. According to one embodiment, the at least one processor is configured to assign a function for calculating the result value to the at least one unspecified data record. According to one embodiment, the at least one processor is configured to display the machine learning problem. According to one embodiment, accepting the input data includes accepting within a spreadsheet display of variables and data values a selection of a group of the variables, the data values, and the at least one unspecified data record.

According to one embodiment, identifying, determining, and generating occur in response to selection of the group. According to one embodiment, the at least one processor is configured to determine a confidence value associated with the result value. According to one embodiment, the at least one processor is configured to encode, visually, the confidence level associated with the result value. According to one embodiment, encoding visually the confidence level associated with the result value includes displaying a value having a high relative confidence value bolder than a value having a lower relative confidence value.

According to one embodiment, the at least one processor is configured to convert categorical values from the input data into set membership binary values. According to one embodiment, the at least one processor is configured to generate the machine learning problem based on symbolic regression. According to one embodiment, the at least one processor is configured to generate one or more possible query patterns that relate a blank cell in a spreadsheet to its surrounding non-blank cells, collect data from the spreadsheet that matches that pattern, execute a ML algorithm to find a model and determine its confidence level, and select the model having the highest confidence level.

According to one embodiment, wherein the at least one processor is configured to fill in values in all blank cells that fit the query pattern using the selected model with the highest confidence level. According to one embodiment, the at least one processor is configured to generate possible patterns including both absolute cell positions and cell positions that are relative to the at least one unspecified data record in a spreadsheet. According to one embodiment, the at least one processor is configured to accept at least one new unspecified data record, and calculating a result value for the at least one new unspecified data record according to the input data and the result value for the at least one unspecified data record.

According to one embodiment, the at least one processor is configured to automatically formulate prediction queries to fill in the at least one unspecified data record. According to one embodiment, the at least one unspecified data record is at least one blank cell in a spreadsheet, and wherein the prediction query is generated based on the relationship between the at least one blank cell and cells having data values. According to one embodiment, the at least one processor is configured to automatically formulate at least one optimization query to fill in the at least one unspecified data record.

According to one embodiment, the at least one unspecified data record is at least one blank cell in a spreadsheet, and wherein the optimization query is generated based on the relationship between the at least one blank cell and cells having data values. According to one embodiment, the at least one processor is configured to generate a model that relates a target value to the blank value; and perform a search to identify the optimal value of the blank cells that minimize the difference between the target value and the value predicted by the model.

According to one embodiment, the at least one processor is configured to hold constant at least some of the non-blank cells corresponding to independent variables as search constraints for optimization. According to one embodiment, the at least one processor is configured to optimize multiple target values simultaneously using a multi-objective optimization technique. According to one embodiment, the at least one processor is configured to accept constraints defined against the at least one unspecified data record.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIGS. 2A-C are example user interface displays, according to one embodiment;

FIGS. 5A-B are example user interfaces illustrating ML problem definition, according to one embodiment;

FIGS. 7A-B are example user interfaces illustrating ML problem definition, according to one embodiment;

FIG. 8 is an example user interface illustrating ML problem definition, according to one embodiment; FIG. 10 is a visual representation of one query pattern capture process, according to one embodiment; and FIG. 11 is a visual representation of query pattern recognition, according to one embodiment.

DETAILED DESCRIPTION

As described above, systems and methods are provided that implement an auto-query process for implementing ML discovery. Various embodiments of the auto-query systems and methods enable users to describe a query for ML discovery indirectly. For example, the system can provide user interface displays that enable selection of data on which to model and specification of values to solve without requiring specification of the query directly. In one example, the system provides user interfaces for interacting with data displayed as a spreadsheet. The user is able to specify values on which they want solutions by providing blank cells where information needs to be predicted or optimized or combinations of both.

According to one embodiment, an auto-query engine is configured to formulate the ML modeling query or optimization search automatically based on the data selected in the display and, for example, the blank cells within that data. The auto-query engine can be configured to generate the ML modeling query or optimization search automatically to best fill in blank data records. According to some embodiments, the engine can analyze data provided by a user to determine the nature of the solution being requested. Depending on the arrangements of data cells and blank cells, the auto-query system is then configured to automatically formulate prediction queries or optimization queries, and generate results accordingly. The automatically generated results can be placed into the formerly blank cells. In some examples, the user interface displays are configured to highlight the generated results and their respective displays to bring to the user's attention the results of the system's operations.

Figure 1:
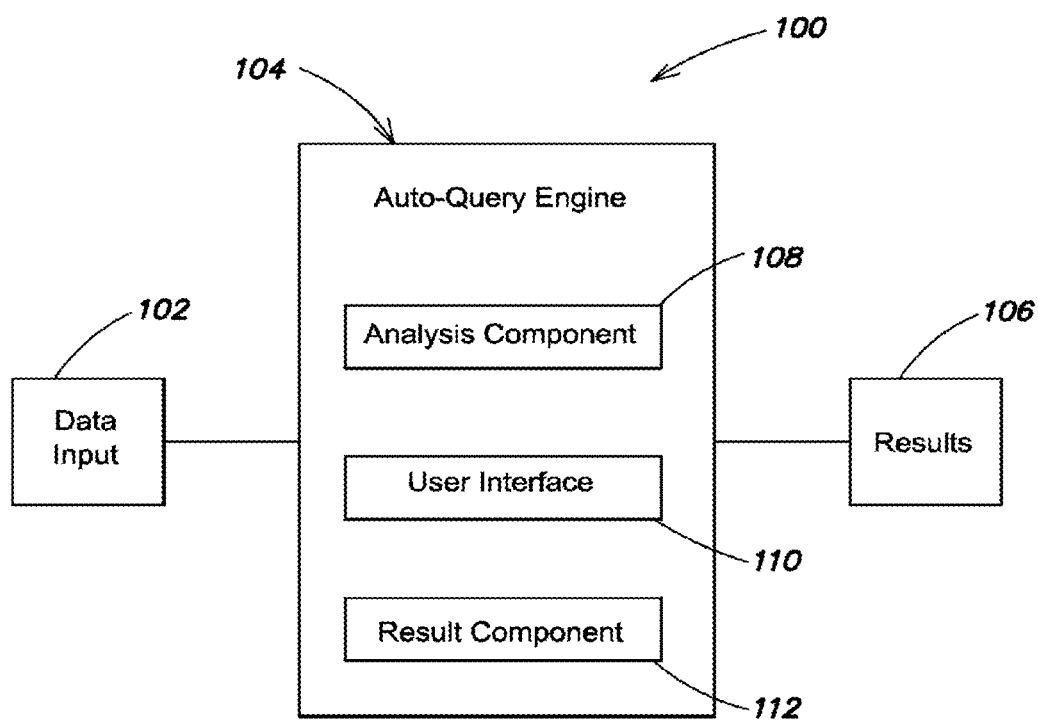
FIG. 1 is a block diagram of an auto-query system, according to one embodiment.

Showing in FIG. 1 is a block diagram of an example auto-query system 100. System 100 can include an auto-query engine 104 for generating ML problems, including ML queries and/or optimization searches, automatically. According to some embodiments, the auto-query engine accepts a data input 102, analyzes the data input to determine a query and/or optimization search that best fits the input data 102. In one example, the auto-query engine 104 executes a generated query on the input data 102 to automatically provide predictions of results 106. In another example, the auto-query engine 104 executes a generated optimization search against the input data 102 to automatically provide results 106 for unknown data records. In further examples, multiple data models may be required to provide solutions for a data set, thus requiring formulation of multiple queries to generate results.

Figure 6:
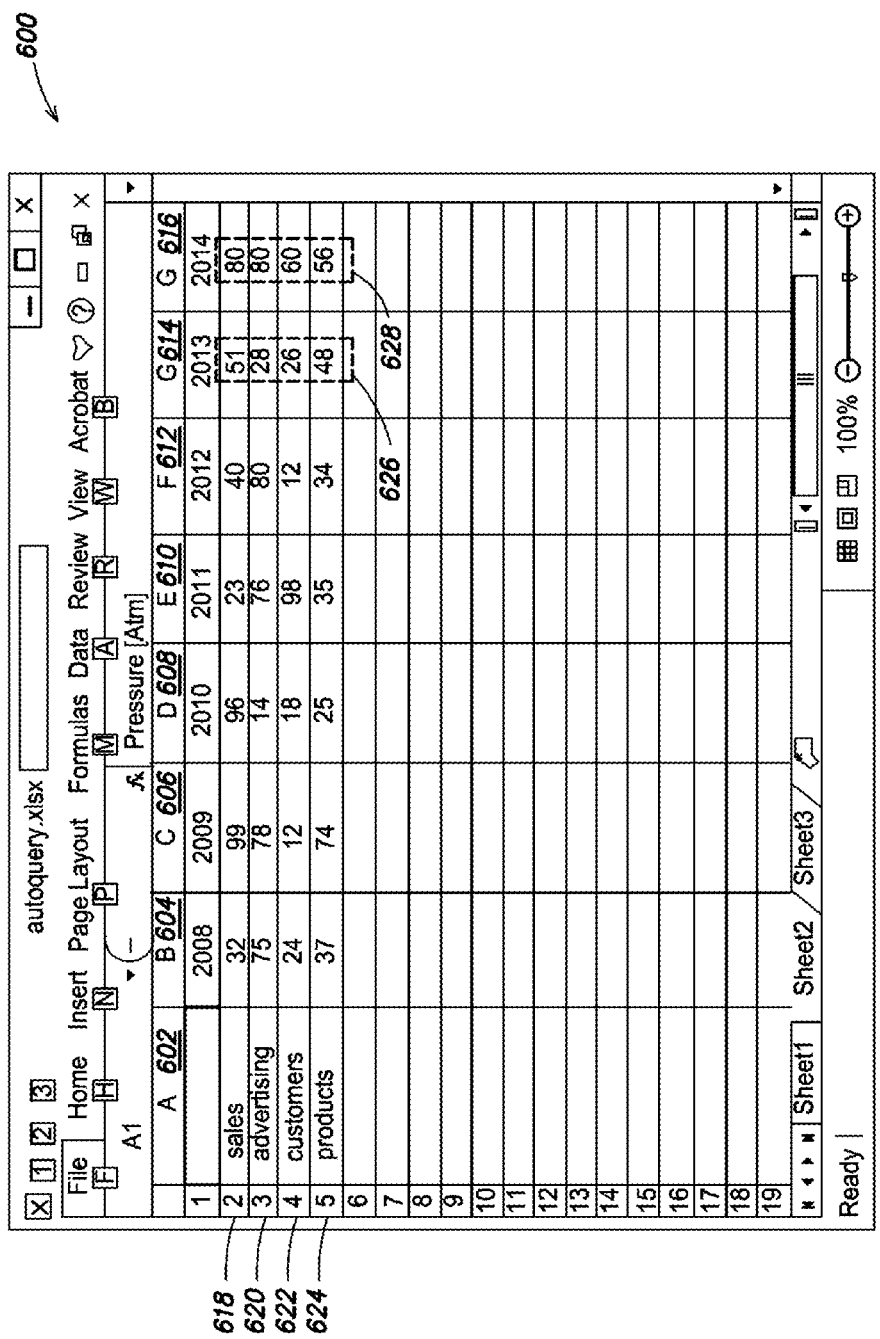
FIG. 6 is an example user interface illustrating ML problem definition, according to one embodiment.

According to another embodiment, the engine 104 can also be configured to test for specific data relationships as part of query and/or optimization search building. For example, time series prediction problems and/or other sequence solving problems can be automatically detected where dependencies exits in the data (e.g., 102), not just across absolute position but also relative relationships (e.g., between each column of data and preceding data for variables in other columns). The engine 104 can be configured to derive relative models for an input data (e.g., 102) and if determined with confidence, can be used to make prediction for results (e.g., 106). In one example, the engine 104 can generate time series predictions (e.g., FIG. 6, shows a times series data set and prediction values, discussed in greater detail below).

According to one embodiment, system 100 and/or its elements (e.g., auto-query engine 104) can be provided using a computing system such as the computer system 600 and/or 602 described with reference to FIG. 6. According to one aspect, the system 100 and/or the auto-query engine 104 can be configured to generate, automatically, ML based queries and/or optimization searches, execute the query and/or optimization, and return results 106 for unknowns within the provided data. In some embodiments, the system 100 and/or auto-query engine 104 is configured to accept selection of data records in a table (e.g., highlighting of cells in an excel sheet) to specify a data input 102 from which the system 100 and/or engine 104 provides ML solutions for any non-specified data cells.

In further embodiments, the system 100 and/or auto-query engine 104 is configured to accept definition of values in conjunction with the input data to constrain the results returned. In one embodiment, the system and/or engine optimizes the results returned according to any defined constraints.

According to another aspect, even the most novice of computer users are easily capable of selection of data records in a table, thus, even the most novice of computer users are enabled to execute sophisticated machine learning techniques and tools to derive powerful predictions and optimization solutions. According to further aspects, returned results are visually encoded in a user interface display to the end user. The visual encoding can be configured to convey, intuitively, information on the results generated through machine learning based solutions. For example, prediction and/or optimization solutions can be associated with a confidence level. The confidence level provides information on the degree to which a model represents the data and/or the degree of error associated with the results (e.g., 106). Each result can be displayed according to an associated level of confidence. In one example, low confidence results are displayed "grayed-out" to demonstrate the low level of certainty with respect to the value. The system and/or engine 104 can be configured to provide varying degrees of highlighting to reflect higher levels of confidence. For example, the more pronounced the highlighting, the greater the level of confidence in a particular result.

According to one embodiment, the auto-query engine 104 can include various system components that perform specific ones or combinations of the functions described. For example, the auto-query engine 104 can include an analysis component 108. According to one embodiment, the analysis component 108 is configured to analyze data communicated to system 100 and/or engine 104. The analysis component can analyze the data (e.g., 102) to determine properties of the input information. For example, the analysis component 108 can be configured to identify headings for data, determine variables based on data positioning, identify unspecified records for result generation, determine any constraints specified (e.g., by a user), among other options. In some embodiments, the analysis component 108 can be configured to identify multiple model problems (e.g., nested prediction problems where multiple models need to be generated to specify multiple queries), times series prediction problems, optimization searches, and, for example, apply any defined constraints to optimization searching.

According to another embodiment, the analysis component 108 can be configured to generate query patterns for data provided (e.g., 102). The analysis component 108 is configured to identify training data from the data provided that matches the query pattern and use that training data to determine one or more data models for solving the query. Shown in FIG. 2A is an example user interface display 200 including a data set supplied as an excel table (e.g., 202), having variable names at row 204, data records to solve (at cells 206). The analysis component identifies the training data at 202 for the data set.

The analysis component 108 is configured to generate a model of the input data. In the example shown, the analysis component 108 determines a relationship between the variables of the data set for the model. Based on the determined relationship(s), the analysis component generates a query containing the training data and an ML problem (e.g., unspecific data=a function of specified data). The analysis component can be configured to execute a variety of approaches for determining a query for the data set provided. In one embodiment, the analysis component is configured to execute symbolic regression techniques to determine models and/or relationships for data. The regression approaches executed can include co-evolutionary symbolic regression. Co-pending U.S. patent application Ser. No. 14/016,287 entitled "SYSTEMS AND METHODS FOR DATA SET SUBMISSION, SEARCHING AND RETRIEVAL," and Ser. No. 14/016,300 entitled "SYSTEMS AND METHODS FOR SYMBOLIC ANALYSIS" describe some approaches for data modeling that can be used in conjunction with embodiments of the present disclosure, which are incorporate by reference herein in their entirety. Additional modeling approaches can be executed by the analysis component, including for example, neural networks, support vector machines, decision trees, symbolic regression, and other techniques. The analysis component 108 can be configured to execute one or more of these techniques to create a mathematical model that can be applied, for example, to predict dependent values from new independent variables, based on examples (training data—e.g., 102).

According to one embodiment, the auto-query engine 104 can also include a user interface component ("UI component") 110 that is configured to generate and/or modify displays shown to an end-user responsive to operations of other components (including e.g., analysis component 108). According to one embodiment, the UI component can be configured to generate displays to an end-user that enable the user, for example, to cut and paste data (e.g., 102) into spreadsheet displays. The UI component 110 can pass the data input to the analysis component 108 for processing. In some embodiments, the UI component 110 can provide functions for uploading data (e.g., in spreadsheet format, csv format, tabular format, etc.). In some embodiments, the UI component 110 can be configured to require users to enter data according to specific formats and provide details to an inputting user on the formats in respective user interface displays (e.g., variable name headers with data for the variable in a respective column or row). In another example, the user interface can accept data without variable definitions. The user interface can be configured to indicate, in response to data without any variable designation, that the data set will be evaluated as unordered data.

According to one embodiment, once the data is accepted the UI component 110 can provide the data to the analysis component 108. The analysis component can be configured to deliver the results of its operations to the UI component 110 for display. For example, in FIG. 2A the analysis component provides information on the problem being solved to the UI component 110, which is displayed at 208 ("Estimate"—reflecting a prediction of a dependent variable from the data in independent variables). Shown in FIG. 2B is an example user interface display 250. Display 250 shows a generated query at 252. The generated query includes for example training data at 254 and the relationship between the variables 256 to be solved using the training data.

In some embodiments, the UI component can be configured to accept specification operations to define the problem to be solved. In one example, the UI component 110 can accept specification of maximize, minimize, limit, etc., with respect to data cells and/or values. The identification of maximize, minimize, limit, etc., indicates a problem to optimize solutions around the specified constraint. In another example, the UI component 110 can also be configured to accept a target value in a data set without any further specification. The analysis component 108 can also be configured to identify such target values (e.g. FIG. 8 at 806) and determine an optimization search to meet the target.

According to another embodiment, the auto-query engine 104 can also include a result component 112 configured to execute any query and/or optimization search generated by the analysis component (e.g., 252 of FIG. 2B). In some implementations, the operations described with respect to the result component 112 can be executed by the analysis component 108, and the auto-query engine 104 can execute with the analysis and UI components alone. In other implementations, the result component 112 can also be a subcomponent of the analysis component 108.

The result component 112 can be configured to execute a variety of approaches for determining results from the query and/or optimization search generated for a data set. In one embodiment, the result component is configured to execute symbolic regression techniques to determine results for a query. The regression approaches executed can include co-evolutionary symbolic regression. Additional approaches for determining results include neural networks, support vector machines, decision trees, and other techniques. The result component 112 can be configured to execute one or more of these techniques to create a result for each unspecified data record in a data set.

As is known, ML solutions are associated with confidence levels reflecting how well an ML approach was able to model and/or fit a set of data. Each result can be associated with a different confidence level, determined, for example, by the result component 112. The confidence level can be determined as the results are being generated or post generation, using for example, a portion of the training data held separately for validation. As discussed above, the results of operations from respective components can be provided to the UI component 110 to enhance displays to an end-user. According to one embodiment, each result determined for a data set can be visually encoded with its respective confidence level. In one example, a display of the data is bolded and/or grayed-out to reflect varying degrees of confidence. A value having a high confidence level can be displayed in bold, while a value having low confidence level can be displayed grayed-out. In one example, intensity of the display of a value corresponds to a confidence level. Shown in FIG. 2C is an example user interface display 270. Display 270 shows a set of results at 272, where each result has an associated visual encoding reflective of a respective confidence level.

Figure 3:
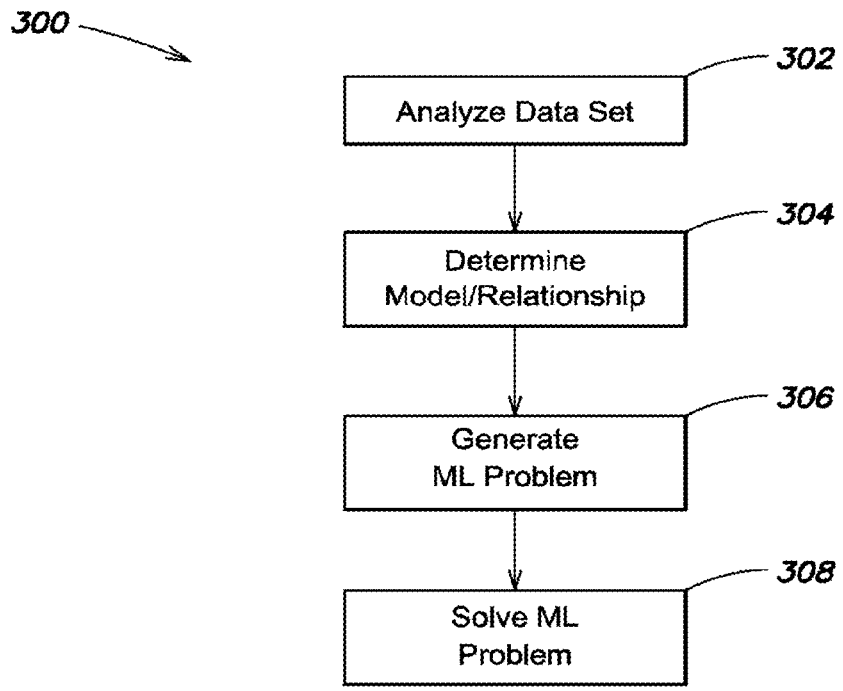
FIG. 3 is an example process flow for generating an ML problem, according to one embodiment.

According to various embodiments, system 100, engine 104, and/or respective components can execute a variety of process to define ML problems automatically from data sets and return results to the automatically defined problems. Shown in FIG. 3 is an example process 300 for automatically defining an ML problem. The process 300 begins at 302 with analysis of a data set. In one example, the data set can be supplied by an end user through a user interface. The user interface can be a local display from a locally executed program. In some examples, the program can be locally resident on the computer machine, executed from a browser, and/or downloaded for execution. In one example, the interface can be generated from a website or portal provided over a communication network (e.g., the Internet).

Analysis of the data set at 302 can include determining the type of problem being requested (e.g., prediction of values, optimization search, nested prediction, time series prediction, or combinations thereof). According to one embodiment, the data set is analyzed at 302 to identify data on which to model (i.e., training data), values to solve, etc. At 304, relationships within the data are determined using ML techniques (e.g., symbolic regression, etc.). The determined relationships are used at 306 to generate automatically an ML problem to be solved. The ML problem to be solved can include a query specifying training data to employ and a relationship between the variables within the training data (e.g. shown at 252 of FIG. 2B). Once the ML problem to be solved is generated, the specification of the ML problem can be displayed, for example, to an end user.

According to some embodiments, process 300 can optionally include steps for solving the generated ML problem, for example, at 308. Once results are generated, the results can also be displayed to an end user.

Figure 4:
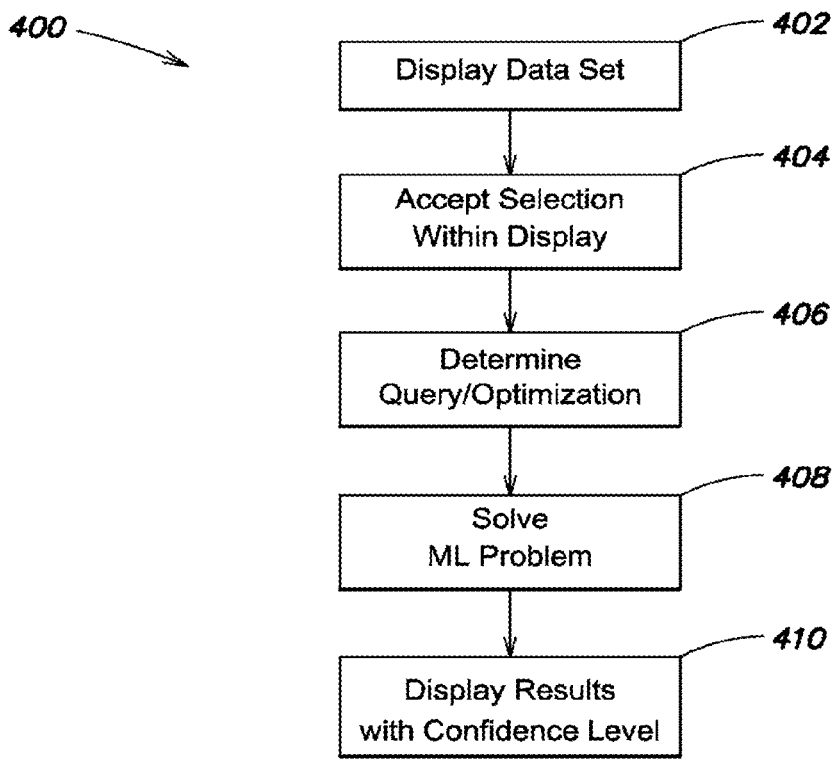
FIG. 4 is an example process flow for generating ML queries and/or optimization searches in response to user input, according to one embodiment.

In some embodiments, a user may interact with user interface displays to define the data to be analyzed and provide any constraints the user may wish to specify for generating solutions. Shown in FIG. 4 is an example process 400 for generating ML queries and/or optimization searches in response to user input. Process 400 begins at 402 within generation of a data entry display. The data entry display can accept user input to define data fields, including, for example, definition of variable names and values for each variable. Further, the data entry display enables specification of data values to be solved. In one example, providing blank records within a spreadsheet display in association with some defined values causes calculation of results for the blank records.

According to one embodiment, process 400 continues with selection of data records within spreadsheet display at 404. Selection can include a drag operation with a mouse to highlight data within a user interface. In some other examples, depressing a control key plus clicking with a mouse on data records enables data selection at 404. In other examples, shift select and other known operations can also be used to highlight data records on which to operate.

Once the data is defined, a query and/or optimization search is generated based on evaluation of the selection data at 406. In one example, generation of a query takes place at 406 based on a determination that the data includes independent variables and unspecified values for dependent variables. A query is generated, automatically, specifying a relationship between the variables and training data on which to solve at 406. In another example, values for independent variables can also be solved by first generating a model to predict dependent values and then using the model to search for values for the independent variables. The search can be constrained, for example, to maximize, minimize, or approach a target value, thus optimizing a particular result according to any constraints. Once the ML problem is specified (including, e.g., query/prediction or optimization), various known ML approaches are executed at 408 to solve the problem specified at 406. At 410, the results of the solution are displayed to the user in the user interface. In some embodiments, the set of results can be displayed with an associated confidence level. For example, each result can be highlighted or de-emphasized according to respective confidence levels associated with the determined result.

Various user interface displays can be generated during execution of process 400, for example, by a UI component 110. Shown below are various user interface displays for interacting with data sets, automatically generating ML problems, and generating solutions to the problems for display to users. According to some embodiments, process 300 and/or 400 can be executed to generate the displays shown. Additionally other processes can be executed (e.g., by an auto-query system 100 and/or engine 104), to generate the user interface displays described. In further embodiments, the operations discussed with respect to process 300 and/or 400 can be executed in different order, can be combined into fewer steps, among other options, for example to provide displays of automatically generated queries, optimization searches, time series predictions, among other options.

FIGS. 2A-C illustrate example interface displays for material property predictions. The dataset shown in 200 can be provided by a user in the form of a spreadsheet, where each column is assigned a variable name (pressure 210, temp 212, flow rate 214, or strength 216 of resulting material). The three first columns are independent variables, and the fourth column is the dependent variable (e.g., as determined by an analysis component 108) that represents the strength of the material produced by a hypothetical manufacturing plant with independent controls over pressure, temperature and flow rate.

According to one embodiment, the top eight rows 202 represent data collected from eight experiments. The bottom six rows 206 represent potential situations for which the user wants to know an expected value. The auto-query system is configured to automatically formulate the query shown in the inset box 252 of FIG. 2B. The query 252 contains both a training dataset 254 (comprising the first eight rows) and an ML query in the form $y=f(x)$ at 256 (e.g., Strength=f (Pressure, Temp, Flow). The system executes the ML query and the resulting model is used to fill in the blank cells (e.g., at 272 of FIG. 2C).

Figure 5A:
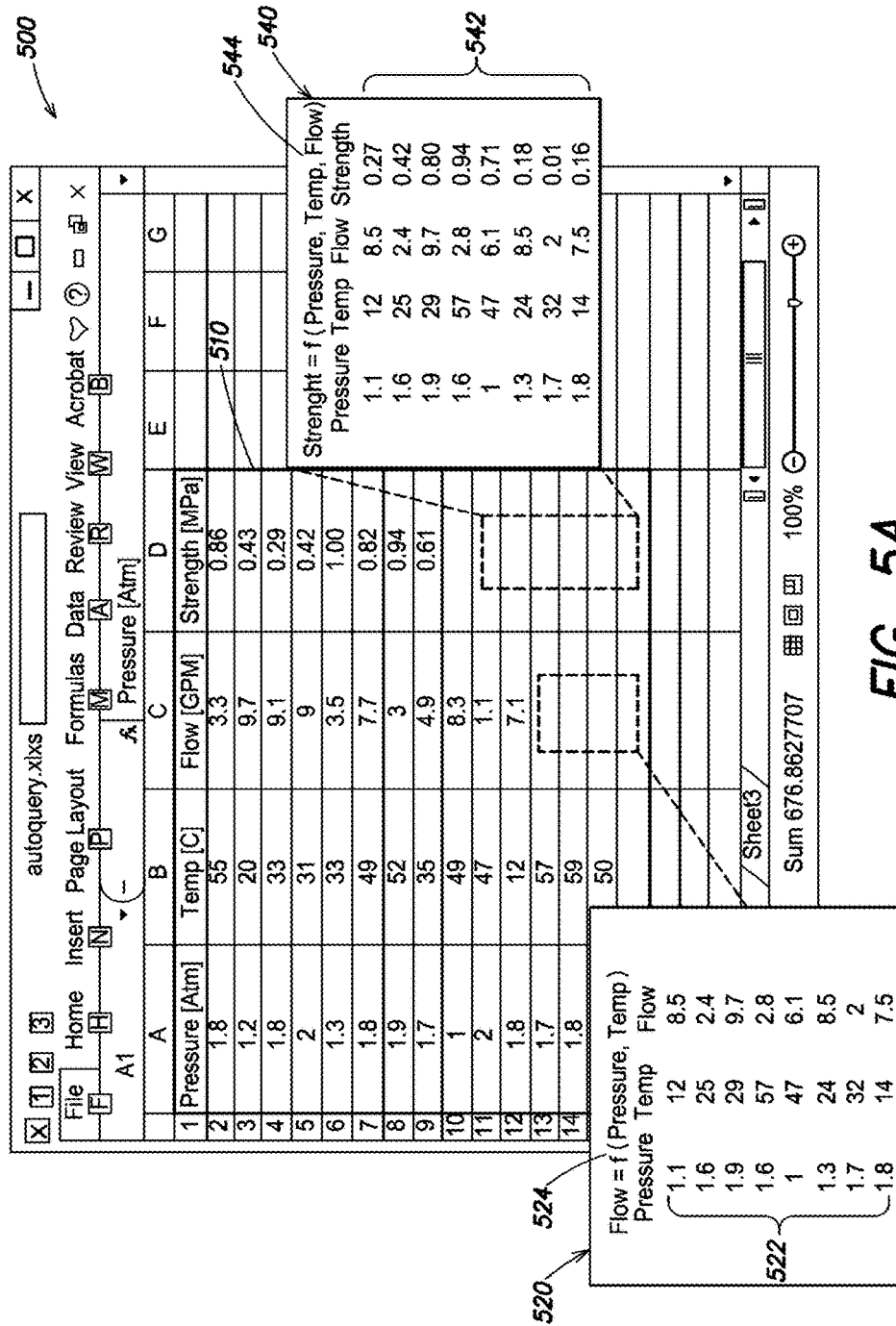

FIG. 5A illustrates another example user interface 500 for a material property prediction. The problem shown in 500 requires that the system develop multiple models and hence multiple queries to provide results. The system (e.g., 100) can be configured to identify "nested model" problems. According to some embodiments, the system can be configured to order nested queries according to the confidence level of the results. In one example, the system implements a dynamic programming approach to generate nested queries and evaluate corresponding confidence levels. Models with more confidence (i.e., less error) are preferred over more uncertain models when choosing between multiple possible pathways for a prediction. Multiple models are generated in all orders possible, and the resulting models are weaned out based on confidence levels.

Shown in FIG. 5A, the leftmost query 520 is generated defining a training data set 522 and a relationship between the variables on which to solve 524. The rightmost query 540 is likewise generated having its own training data 542 and relationship 544 for solving. Based on the dynamic programming evaluation of confidence, the left side query 520 is issued before the right-side query 540. As shown, the results from the left queries are then used as inputs to define solutions according to the right side model. In some embodiments, the system (e.g., 100) and/or engine (e.g., 104) is configured to execute the well-known dynamic programming approach to preparing and ordering execution of queries to generate solutions for a data set. The dynamic programming approach employs a "divide and conquer" approach, where sub-problems are solved first and the larger problems make use of solutions to sub-problems.

Shown in FIG. 5B is another example display 550. Display 550 illustrate an example nested solution and associated results, where the results for the left side query are shown at 552 and the results for the right side query at 554. As discussed, respective confidence levels can be illustrated at 552 and 554 respectively. In one example, the more grayed out a solution appears in the display the lower the confidence level associated with the respective solution. In addition to confidence level displays, the system can be configured to provide contextual information for a given solution. At 556 and 558, the system can provide displays (e.g., through a UI component) configured to describe the model used to generate the results and any reasoning from the model analysis. In this setting, provided are the functions derived for the left side query 558 and an indicator regarding the confidence levels of the results which can be displayed upon selection of "Why" at 556. According to one example, the "Why" display at 556, is configured to facilitate understanding of the confidence levels and model associated with the generated results.

According to other embodiments, the system and/or engine (e.g., 100 and/or 104) can also be configured to identify dependencies within data sets not just across absolution position (e.g., rows 618-24 of FIG. 6) but also relative relationships (e.g., between each column 602-616). In this example, the system detects the relative relationship between a column and its two preceding columns to the left by generating data models on the input data. According to one embodiment, the system is configured to identify and automatically attempt modeling/result generation on the basis of relative relationships within the data. If appropriate models and/or results can be found with confidence, the resulting predictions are provided by the system, for example, as time series predictions at 626 and 628 in display 600.

According to some embodiments, similar displays can provide for specification of optimization solutions. Shown in FIG. 7A is an example display 700. Display 700 is configured to accept specification of a target value for optimizing solutions. In an optimization situation, the independent variables are left blank and the target value is provided (e.g., at 702). In some embodiments, the optimization request can come as part of an interaction session between the system and a user. For example, the user can have requested prediction scenarios to generate results at 704. Additionally nested prediction scenarios can have been executed on the system to derive results at 706. In one alternative, the user may also provide training data and input an optimization value (e.g., at 702) to cause the system to generate optimization solutions without other preceding solutions being required.

According to one embodiment, the system (e.g., 100) and/or engine (e.g., 104) formulates a model to predict the dependent values from the independent values, according to training data identified (e.g., at 708 and in another example using other predictions at 710). The system and/or engine uses the model to search for the best values for the independent variables 712 so that outcome from the model matches the specified target dependent value or in another example, gets close to it.

Figure 7B:
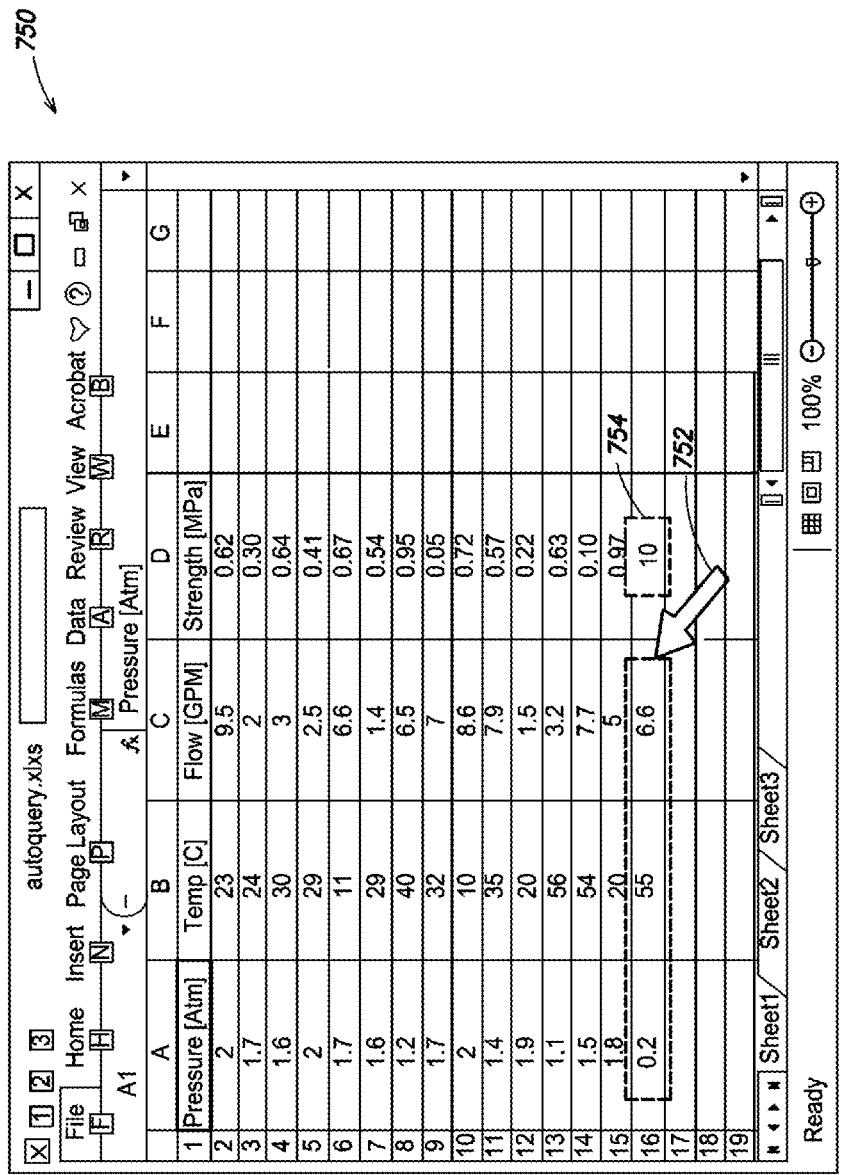

Shown in FIG. 7B is an example display 750 with a display of results calculated according to an optimization value entered at 754. The display of the results at 752 provide the values determined to meet, exceed, and/or come as close to the optimization value as possible. In some examples, a background highlight may provide a visual indication that an optimization value could not be achieved. In some examples, if an optimization value could not be achieved, the best possible value can be provided with the values for the independent variables that generated the best possible value.

FIG. 7A illustrates a maximization problem specified using a high target value (e.g., 10 at 702). The system can also be configured to accept a low target value (e.g., 0) to specify a minimization problem. In another example, the system can also process an arbitrary value and use the arbitrary value to specify a target optimization problem, such that the results provided deliver the target value or as close to the target value as possible.

FIG. 8 illustrates another display 800 in another solution scenario. Display 800 illustrates a constrained optimization scenario. In this example, the user has specified a minimization problem by entering "0" at 802. In one embodiment, the system is configured to determine the best values for the independent values at 804 to meet the minimization request by the user. However, in this example, the user has also specified a value at 806. According to one embodiment, the system is configured to recognize when some of the independent variables are specified, and others are not. The system recognizes this scenario as a constrained optimization problem. In response, the system is configured to optimize only the values of the unspecified independent variables (e.g., 808 and 810).

According to various embodiments, the display provided to end users can include a number of features that are configured to enable even novice users the ability to interact with and understand the nature of the results being returned. For example, a UI component of the system can be configured to enable users to formulate ML problem (e.g., queries) by dragging a selection box (e.g., 211 of FIG. 2, 510 of FIG. 5, etc.) over both the data and the blank query cells. In some examples, the UI component can provide an activity button in user interface displays. Once the set of data is selected the user can click an activity button (e.g., 208 of FIG. 2) to generate a set of results. The activity button can be labeled "Estimate" or "fill in the blanks," among other options. In addition, a menu option can also be provided to begin processing, and in another example, the user can right click the selection box to access another menu including an "Estimate" or "Fill in the Blanks" option.

As discussed, each display of a set of results can include visual encoding of the results. In one example, the grayscale color of the cells filled in represents the uncertainty of the value computed, where bold colors represent more confidence, and blander colors represent less confidence.

According to some embodiments, rather than provide results as values in various spreadsheet displays, the system, engine, and/or UI component is configured to provide the formula to calculate the result value as an entry in a spreadsheet. According to some embodiments, providing the formula rather than a constant, results in improvements. In one example, the displayed predicted/optimized value is configured to adjust automatically in response to changes made in the values of the independent variables. According to some embodiments, the system can be configured to analyze the modification of values according to the provided formulas to maintain determinations of confidence with respect to a displayed value. In some applications the brightness of the value may also change if the confidence of the prediction/optimization changes.

In another example, providing the formula (e.g., by system 100, engine 104, and/or UI component 110) enables the user to examine the formula to gain insight into the relationship found.

Figure 10:
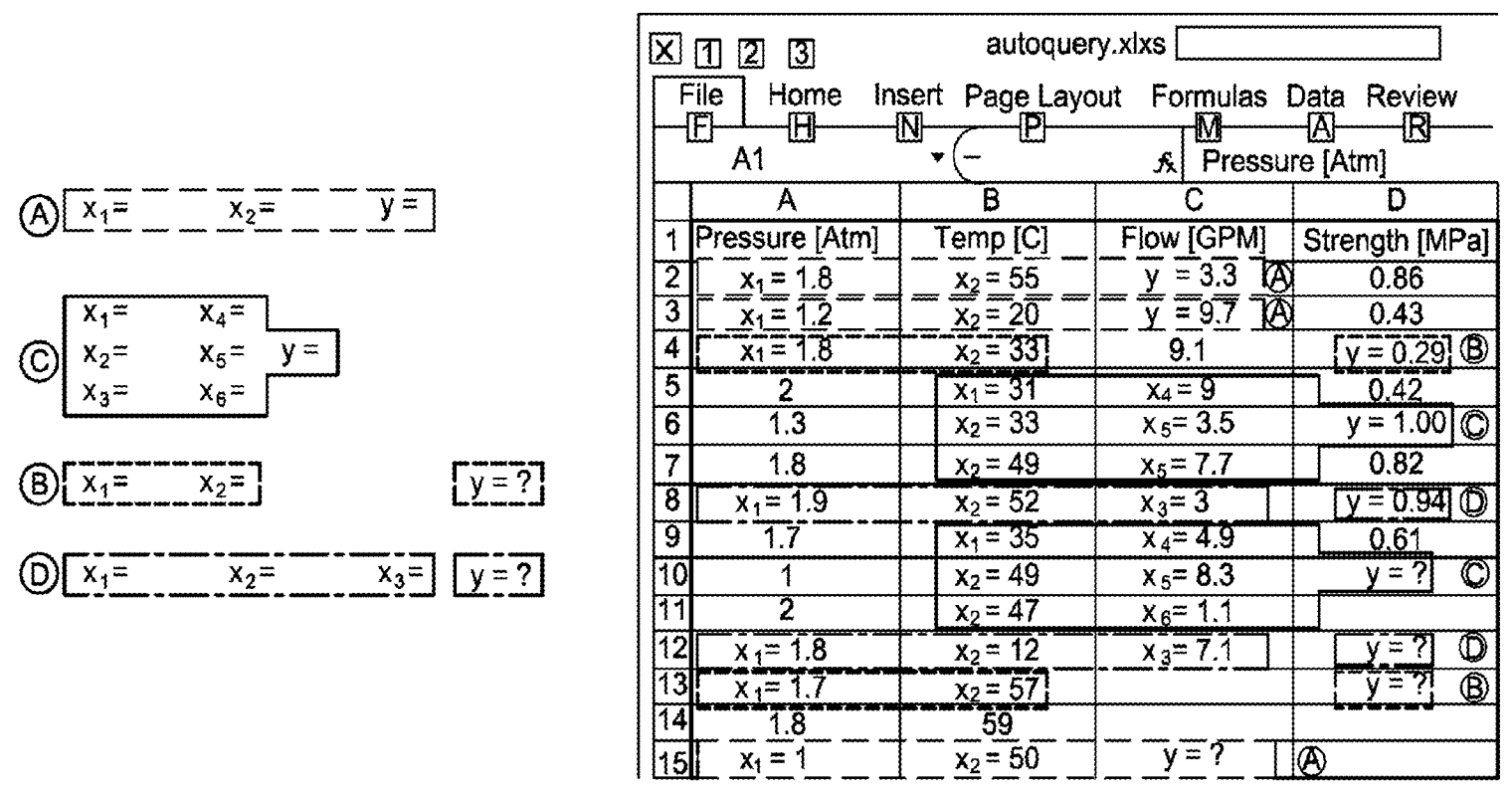

Shown in FIG. 10 is a visual representation of one query pattern capture process, according to one embodiment. In one example, in order to issue a query for modeling or optimization, the system first generates a pattern that contains slots for independent values (represented here as x) and slots for dependent values (represented here as y). The example patterns are defined by the system during analysis of the data shown in FIG. 10. The system can be configured to apply each pattern to the data grid at multiple locations, and even multiple patterns for overlapping locations. When both the independent and dependent slots in the pattern are filled with values, the pattern serves for collecting data. When only the slots labeled x are filled with values but the slots with y are blanks, the pattern identifies a place where the result from the query $y=f(x)$ can be applied.

In various executions, many potential patterns will be identified for filling each blank cell, and some executions multiple patterns can be used to fill in multiple cells. For example, the "A" template can be used to collect 11 data points and to fill in three blanks. The "B" template can be used to collect data from 8 locations and can be used to fill in six blank slots. The "C" template can be used to collect data from 7 locations and can be used to fill in two blanks. The "D" template can be used to collect data from eight locations and can be used to complete the values of six blank cells. Each template therefore has different usefulness depending on how much data it can collect, how many blanks it can fill, and what confidence level the corresponding ML model will provide.

In some executions, the system is configured to identify the highest confidence template for use with each blank cell. Generally, the confidence of the model generated by the system depends on the amount of data collected by the template and the complexity of the underlying relationship between x and y in the template, if one exists.

Figure 11:
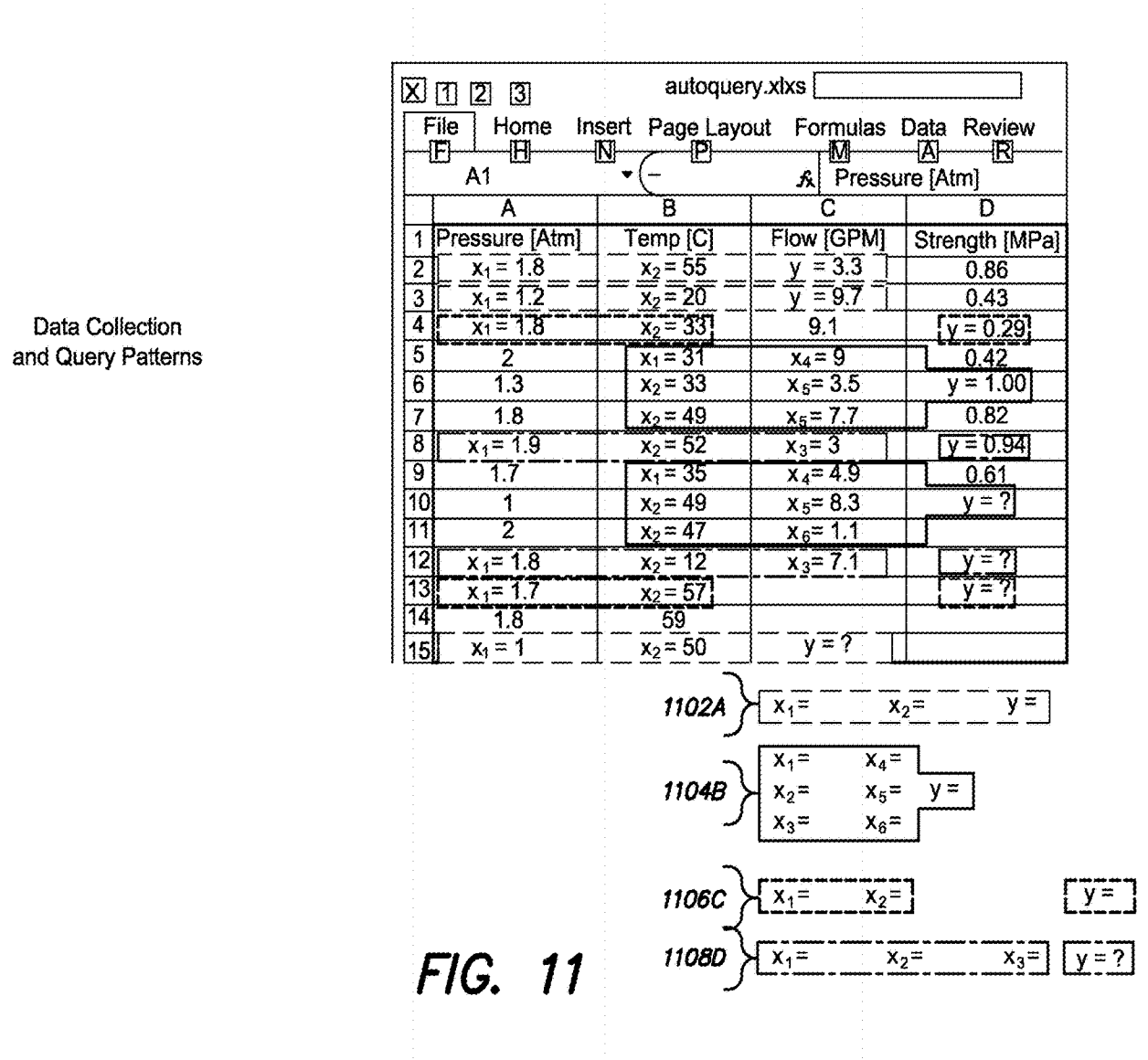

According to some embodiments, it is not always possible to try out all possible templates. Some algorithms implemented by the system are configured to try out a subset of all possible templates, noting that some templates are contained within other templates. The system can be configured to leverage the property that smaller templates will generally provide more data and simpler models, whereas larger models may entail more variables collect less data. The system balances this property against the property that larger templates make less a-priori assumptions about the structure of the relationships. Thus, in some embodiments, the large templates can be used to first identify coarse relationships, and those identified coarse relationships used to guide the selection of narrower models to generate more refined queries. For example, the "C" template is contained within the "D" template. The "C" template is therefore more specific than the "D" template. However, the "D" template can be used first by the system and if the resulting model only uses the leftmost two of the three dependent variables, the "C" template is analyze by the system. Blanks in column 4 rows 10-12 are filled in using the model resulting from the "D" or "C", whichever has higher confidence. In one example, the blanks in the last three rows of column 4 cannot use the "D" template, so the system selects the "C" template. FIG. 11 is a visual representation of one example of query pattern recognition, according to one embodiment.

1102A is an example of one pattern useful for filling in blacks in the third column. This pattern could be used to collect data from rows where all cells are provided (for example row 2&3) and also used to formulate a query when some of the cells are missing (row 15). 1104B is an example of another pattern useful for filling in blanks in the fourth column. This pattern could be used to collect data from rows where all cells are provided (for example rows 5, 6 & 7) and also to formulate a query when some of the cells are missing (rows 9, 10 & 11). 1106C is an example of an alternative pattern useful for filling in blanks in the fourth column. This pattern could be used to collect data from rows where cells are provided (for example row 3) and also used to formulate a query when some of the cells are missing (row 13, 14, and 15). 1108D is an example of another pattern (Rows 8 & 12).

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 9:
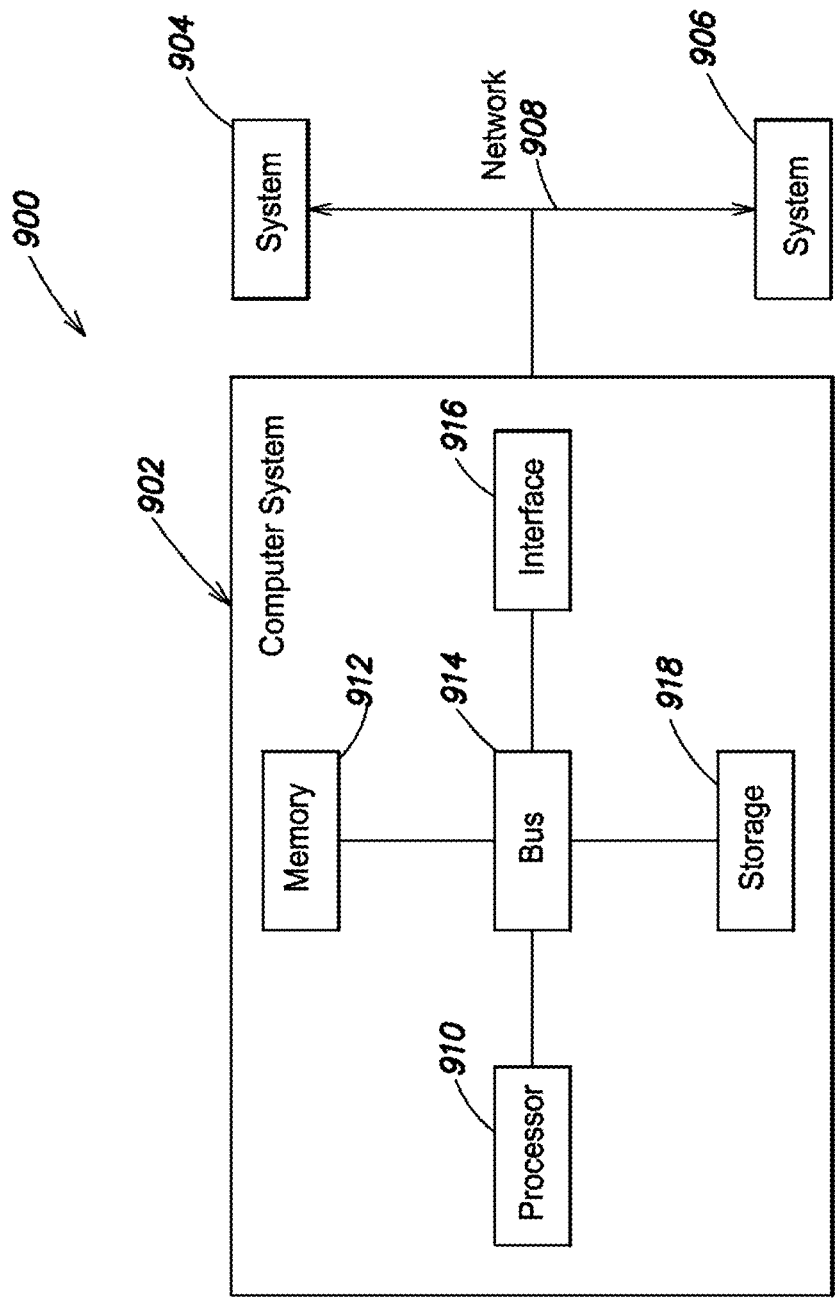
FIG. 9 is a block diagram of one example of a computer system that may be used to perform processes and functions disclosed herein.

FIG. 9 shows a block diagram of a distributed computer system 900, in which various aspects and functions in accord with the present invention may be practiced. The distributed computer system 900 may include one or more computer systems. For example, as illustrated, the distributed computer system 900 includes three computer systems 902, 904 and 906. As shown, the computer systems 902, 904 and 906 are interconnected by, and may exchange data through, a communication network 908. The network 908 may include any communication network through which computer systems may exchange data. To exchange data via the network 908, the computer systems 902, 904, and 906 and the network 908 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services.

Computer systems 902, 904 and 906 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 904 and other computing devices in the network.

To ensure data transfer is secure, the computer systems 902, 904 and 906 may transmit data via the network 908 using a variety of security measures including TSL, SSL or VPN, among other security techniques. While the distributed computer system 900 illustrates three networked computer systems, the distributed computer system 900 may include any number of computer systems, networked using any medium and communication protocol.

Various aspects and functions in accord with the present invention may be implemented as specialized hardware or software executing in one or more computer systems including the computer system 902 shown in FIG. 9. As depicted, the computer system 902 includes a processor 910, a memory 912, a bus 914, an interface 916 and a storage system 918. The processor 910, which may include one or more microprocessors or other types of controllers, can perform a series of instructions that manipulate data. The processor 910 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 910 is connected to other system placements, including a memory 912, by the bus 914.

The memory 912 may be used for storing programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device, such as flash memory or phase-change memory (PCM). Various embodiments in accord with the present invention can organize the memory 912 into particularized and, in some cases, unique structures to perform the aspects and functions disclosed herein.

Components of the computer system 902 may be coupled by an interconnection element such as the bus 914. The bus 914 may include one or more physical busses (for example, busses between components that are integrated within a same machine), and may include any communication coupling between system placements including specialized or standard computing bus technologies such as IDE, SCSI, PCI and InfiniBand. Thus, the bus 914 enables communications (for example, data and instructions) to be exchanged between system components of the computer system 902.

Computer system 902 also includes one or more interfaces 916 such as input devices, output devices and combination input/output devices. The interface devices 916 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 916 allow the computer system 902 to exchange information and communicate with external entities, such as users and other systems.

Storage system 918 may include a computer-readable and computer-writeable nonvolatile storage medium in which instructions are stored that define a program to be executed by the processor. The storage system 918 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the storage system 918. The memory may be located in the storage system 918 or in the memory 912. The processor 910 may manipulate the data within the memory 912, and then copy the data to the medium associated with the storage system 918 after processing is completed. A variety of components may manage data movement between the medium and the memory 912, and the invention is not limited thereto.

Further, the invention is not limited to a particular memory system or storage system. Although the computer system 902 is shown by way of example as one type of computer system upon which various aspects and functions in accord with the present invention may be practiced, aspects of the invention are not limited to being implemented on the computer system, shown in FIG. 9. Various aspects and functions in accord with the present invention may be practiced on one or more computers having different architectures or components than that shown in FIG. 9. For instance, the computer system 902 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 902 may include an operating system that manages at least a portion of the hardware placements included in computer system 902. A processor or controller, such as processor 910, may execute an operating system which may be, among others, a Windows-based operating system (for example, Windows NT, Windows 2000/ME, Windows XP, Windows 7, Vista, or 8) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method, comprising:
   accessing, by a computer system, input data comprising:
      training data comprising a first plurality of data records, each of the first plurality of data records having numeric data values at least for first and second variables in a plurality of variables; and
      a second plurality of data records comprising at least a first not fully specified data record that does not include a first numeric data value for the first variable in the plurality of variables;
   generating, by the computer system and using the training data, a representation of a relationship between the first variable and at least the second variable in the plurality of variables; and
   obtaining, by the computer system and using the generated representation, at least the first numeric data value for the first variable in the first not fully specified data record.

2. A system, comprising:
   using at least one hardware processor to perform:
   accessing input data comprising:
      training data comprising a first plurality of data records, each of the first plurality of data records having numeric data values at least for first and second variables in a plurality of variables; and
      a second plurality of data records comprising at least a first not fully specified data record that does not include a first numeric data value for the first variable in the plurality of variables;
   generating, using the training data, a representation of a relationship between the first variable and at least the second variable in the plurality of variables; and
   obtaining, by the computer system and using the generated representation, at least the first numeric data value for the first variable in the first not fully specified data record.

3. The method of claim 1, wherein generating the representation comprises using a machine learning technique to generate a mathematical model representing the relationship between the first variable and at least the second variable.

4. The method of claim 1, wherein generating the mathematical model representing the relationship between the first variable and at least the second variable is performed by using symbolic regression.

5. The method of claim 1, wherein accessing the input data is performed using a spreadsheet user interface, and wherein generating the representation of the relationship comprises:
   generating one or more candidate query patterns that relate a blank cell in the spreadsheet user interface to its surrounding non-blank cells in the spreadsheet user interface;
   for each pattern in the one or more candidate query patterns:
      collecting data from the spreadsheet user interface that matches the pattern,
      generating, using a machine learning technique and the collected data, a respective candidate mathematical model representing a relationship between a variable associated with the blank cell and one or more variables associated with the surrounding non-blank cells;
      determining a confidence associated with the generated candidate mathematical model; and
   selecting the generated candidate mathematical model having a highest confidence level as the representation of the relationship.

6. The method of claim 1, further comprising:
   identifying, by the computer system, the first not fully specified data record in the second plurality of data records.

7. The method of claim 1, wherein accessing the input data comprises:
   receiving, within a spreadsheet user interface, a selection of the first plurality of data records and the second plurality of data records.

8. The method of claim 1, further comprising:
   determining a confidence value for the first numeric data value; and
   displaying the first numeric data value with an intensity that depends on the confidence value.

9. The method of claim 1, wherein the first not fully specified data record does include a second numeric data value for the second variable in the plurality of variables and does not include a third numeric data value for a third variable in the plurality of variables, and wherein the obtaining comprises obtaining, using the generated representation and an optimization technique, the first numeric data value and the third numeric data value based on the second numeric data value.

10. The system of claim 2, wherein generating the representation comprises using a machine learning technique to generate a mathematical model representing the relationship between the first variable and at least the second variable.

11. The system of claim 2, wherein generating the mathematical model representing the relationship between the first variable and at least the second variable is performed by using symbolic regression.

12. The system of claim 2, wherein accessing the input data is performed using a spreadsheet user interface, and wherein generating the representation of the relationship comprises:
   generating one or more candidate query patterns that relate a blank cell in the spreadsheet user interface to its surrounding non-blank cells in the spreadsheet user interface;
   for each pattern in the one or more candidate query patterns:
      collecting data from the spreadsheet user interface that matches the pattern,
      generating, using a machine learning technique and the collected data, a respective candidate mathematical model representing a relationship between a variable associated with the blank cell and one or more variables associated with the surrounding non-blank cells;
      determining a confidence associated with the generated candidate mathematical model; and
   selecting the generated candidate mathematical model having a highest confidence level as the representation of the relationship.

13. The system of claim 2, further comprising:
identifying, by the computer system, the first not fully specified data record in the second plurality of data records.

14. The system of claim 2, wherein accessing the input data comprises:
receiving, within a spreadsheet user interface, a selection of the first plurality of data records and the second plurality of data records.

15. The system of claim 2, further comprising:
determining a confidence value for the first numeric data value; and
displaying the first numeric data value with an intensity that depends on the confidence value.

16. The system of claim 2, wherein the first not fully specified data record does include a second numeric data value for the second variable in the plurality of variables and does not include a third numeric data value for a third variable in the plurality of variables, and wherein the obtaining comprises obtaining, using the generated representation and an optimization technique, the first numeric data value and the third numeric data value based on the second numeric data value.

17. The method of claim 7, wherein the generating and obtaining occur in response to receiving the selection.

18. The method of claim 9, wherein the optimization technique comprises a gradient search technique.

19. The system of claim 14, wherein the generating and obtaining occur in response to receiving the selection.

20. The system of claim 16, wherein the optimization technique comprises a gradient search technique.

* * * * *